(12) United States Patent
Lippert

(10) Patent No.: US 9,291,244 B2
(45) Date of Patent: Mar. 22, 2016

(54) NINE SPEED AUTOMATIC TRANSMISSION

(71) Applicant: FORD GLOBAL TECHNOLOGIES, LLC, Dearborn, MI (US)

(72) Inventor: Robert Scott Lippert, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 169 days.

(21) Appl. No.: 14/157,632

(22) Filed: Jan. 17, 2014

(65) Prior Publication Data

US 2015/0204422 A1  Jul. 23, 2015

(51) Int. Cl.
*F16H 3/62* (2006.01)
*F16H 3/66* (2006.01)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC .............. F16H 3/62; F16H 2200/2012; F16H 2200/2046
See application file for complete search history.

(56) References Cited

U.S. PATENT DOCUMENTS

| 7,736,263 B2 | 6/2010 | Phillips et al. |
| 7,927,248 B2 | 4/2011 | Hart et al. |
| 7,976,425 B2 | 7/2011 | Wittkopp et al. |
| 7,993,236 B2 | 8/2011 | Hart et al. |
| 8,007,398 B2 | 8/2011 | Phillips et al. |
| 8,047,954 B2 | 11/2011 | Phillips et al. |
| 8,052,566 B2 | 11/2011 | Wittkopp et al. |
| 8,052,567 B2 | 11/2011 | Hart et al. |
| 8,096,915 B2 | 1/2012 | Wittkopp et al. |
| 8,663,053 B2 * | 3/2014 | Beck ......................... F16H 3/66 475/276 |
| 8,992,373 B2 * | 3/2015 | Beck ....................... F16H 3/666 475/271 |
| 9,062,745 B2 * | 6/2015 | Etchason .................. F16H 3/62 |
| 2010/0279814 A1 | 11/2010 | Brehmer et al. |
| 2011/0045939 A1 | 2/2011 | Gumpoltsberger et al. |
| 2011/0045941 A1 | 2/2011 | Gumpoltsberger et al. |
| 2011/0045943 A1 | 2/2011 | Gumpoltsberger et al. |
| 2011/0165153 A1 | 7/2011 | Heider et al. |
| 2011/0306460 A1 | 12/2011 | Haupt et al. |
| 2012/0071289 A1 | 3/2012 | Wittkopp et al. |
| 2012/0115672 A1 | 5/2012 | Gumpoltsberger et al. |
| 2012/0172173 A1 | 7/2012 | Wittkopp et al. |
| 2013/0023376 A1 | 1/2013 | Hart et al. |

(Continued)

FOREIGN PATENT DOCUMENTS

DE     10 2012 203 069     *   8/2013

*Primary Examiner* — Sherry Estremsky
(74) *Attorney, Agent, or Firm* — James A. Dottavio; Brooks Kushman P.C.

(57) ABSTRACT

Transmissions with at least four gearing-arrangements and six clutches that produce nine forward speeds and one reverse. The gearing-arrangements may be simple planetary gearsets. The six clutches may include one to three brakes, and at least one clutch is an input clutch and one an output clutch. The input-shaft of each transmission may be associated with a carrier of one of the simple planetary gearsets. The input-shaft may be associated with carrier-1. The output-shaft of some transmissions may be associated with a carrier of another of the simple planetary gearsets. The output-shaft may be associated with carrier-4. Sun and ring gears in gearing-arrangements may be connected to a transmission housing. Sun-3 and ring-4 may be grounds.

22 Claims, 2 Drawing Sheets

(56) References Cited

U.S. PATENT DOCUMENTS

2013/0196813 A1* 8/2013 Oita .................. F16H 3/66 475/284

2015/0094184 A1* 4/2015 Lippert .................. F16H 3/66 475/275

* cited by examiner

| | C-1 | C-2 | C-3 | C-4 | C-5 | C-6 | Ratio | Step |
|---|---|---|---|---|---|---|---|---|
| Rev | | | X | X | | X | -3.117 | 0.704 |
| 1st | | | X | | X | X | 4.429 | |
| 2nd | X | | | | X | X | 3.409 | 1.299 |
| 3rd | X | | X | | | X | 2.569 | 1.327 |
| 4th | X | X | | | | X | 2.043 | 1.258 |
| 5th | | X | X | | | X | 1.404 | 1.455 |
| 6th | X | X | X | | | | 1.000 | 1.404 |
| 7th | | X | X | | X | | 0.873 | 1.146 |
| 8th | X | X | | | X | | 0.672 | 1.299 |
| 9th | | X | | X | X | | 0.612 | 1.097 |

Betas: GA-1: 1.579, GA-2: 1.982, GA-3: 3.057, GA-4: 1.569

NINE SPEED AUTOMATIC TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed to run at a quieter, more fuel efficient cruising speed. Typically, a transmission has a housing mounted to the vehicle structure, an input-shaft driven by an engine crankshaft, and an output-shaft driving the vehicle wheels, often via a differential assembly which permits the left and right wheel to rotate at slightly different speeds as the vehicle turns.

Some vehicles are equipped with a transfer case which directs the power to both front wheels and rear wheels. Some transfer cases provide multiple transfer case ratios between the transmission output-shaft and the differential such that a driver can select a high range and a low range. The high range may be selected for on-road transportation while the low range may be used to provide higher speed ratios for off-road use. When a two speed transfer case is present, the overall ratio is the product of the transmission ratio and the transfer case ratio. In some situations, such as transitioning from on-road to off-road or from off-road to on-road conditions, it is desirable to shift between high and low range while the vehicle is moving, preferably without interrupting the flow of power to the vehicle wheels. In a transverse front wheel drive vehicle, space limitations usually preclude use of a two speed transfer case.

SUMMARY

One aspect of this disclosure is directed to a transmission having four gearing-arrangements (GA) and six clutches (C). In this transmission, GA-1 is configured to impose a linear speed relationship (LSR) among a shaft-1, input-shaft and shaft-2 and GA-2 is configured to impose a LSR among shaft-2, a shaft-3, and a shaft-4. GA-3 may be configured to impose a LSR among a shaft-5, shaft-4 and shaft-3 and GA-4 may be configured to impose a LSR among shaft-4, the output-shaft and a shaft-6.

In this aspect, C-1 is configured to selectively couple the input-shaft to shaft-3. C-2 is configured to selectively couple shaft-2 to the output-shaft. C-3 is configured to selectively couple shaft-1 to shaft-3. C-4 may be a brake and configured to selectively couple shaft-1 to a ground. C-5 may be a brake and configured to selectively couple shaft-5 to the ground. C-6 may also be a brake and configured to selectively couple shaft-6 to the ground.

In addition, the four gearing-arrangements may be planetary Gearsets (PG) having a sun, carrier and ring respectively associated with the shafts. The four gearing-arrangements may be simple planetary gearsets. GA-1 may be PG-1 having a sun-1, carrier-1 and ring-1 respectively associated with shaft-1, input-shaft and shaft-2. GA-2 may be PG-2 having a sun-2, carrier-2 and ring-2 respectively associated with shaft-2, shaft-3 and shaft-4. GA-3 may be PG-3 having a sun-3, carrier-3 and ring-3 respectively associated with shaft-5, shaft-4 and shaft-3. GA-4 may be PG-4 having a sun-4, carrier-4 and ring-4 respectively associated with shaft-4, the output-shaft, and shaft-6.

According to another aspect of this disclosure a transmission having four planetary gearsets (PG) and six clutches (C) is shown. The four planetary gearsets may be simple planetary gearsets. In this aspect, PG-1 has a sun-1, carrier-1 and ring-1 respectively associated with a shaft-1, input-shaft and shaft-2. PG-2 has a sun-2, carrier-2 and ring-2 respectively associated with shaft-2, shaft-3 and shaft-4. C-1 is configured to selectively couple carrier-1 to carrier-2. C-2 is configured to selectively couple sun-2 to an output-shaft. C-3 is configured to selectively couple sun-1 to carrier-2.

PG-3 may have a sun-3, carrier-3 and ring-3 respectively associated with a shaft-5, shaft-4 and shaft-3. PG-4 may have a sun-4, carrier-4 and ring-4 respectively associated with shaft-4, the output-shaft and a shaft-6. C-4 may be configured to selectively couple Sun-1 to a ground. C-5 may be configured to selectively couple Sun-3 to the ground. C-6 may also be configured to selectively couple ring-4 to the ground.

A further aspect of this disclosure is about a transmission having four gearing-arrangements (GA) and six clutches (C), where GA-1 is configured to impose a LSR among a shaft-1, input-shaft and shaft-2, GA-2 is configured to impose a LSR among shaft-2, a shaft-3, and a shaft-4, GA-3 is configured to impose a LSR among shaft-3, shaft-4 and a shaft-5, and GA-4 is configured to impose a LSR among shaft-4, an output-shaft and a shaft-6.

In this aspect, C-1 may be configured to selectively couple the input-shaft to shaft-3. C-2 may be configured to selectively couple shaft-2 to an output-shaft. C-3 may be configured to selectively couple shaft-1 to shaft-3. C-4 may be configured to selectively couple shaft-1 to a ground. C-5 may be configured to selectively couple shaft-5 to a ground. C-6 may be configured to selectively couple shaft-6 to a ground.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figures 1, 2:
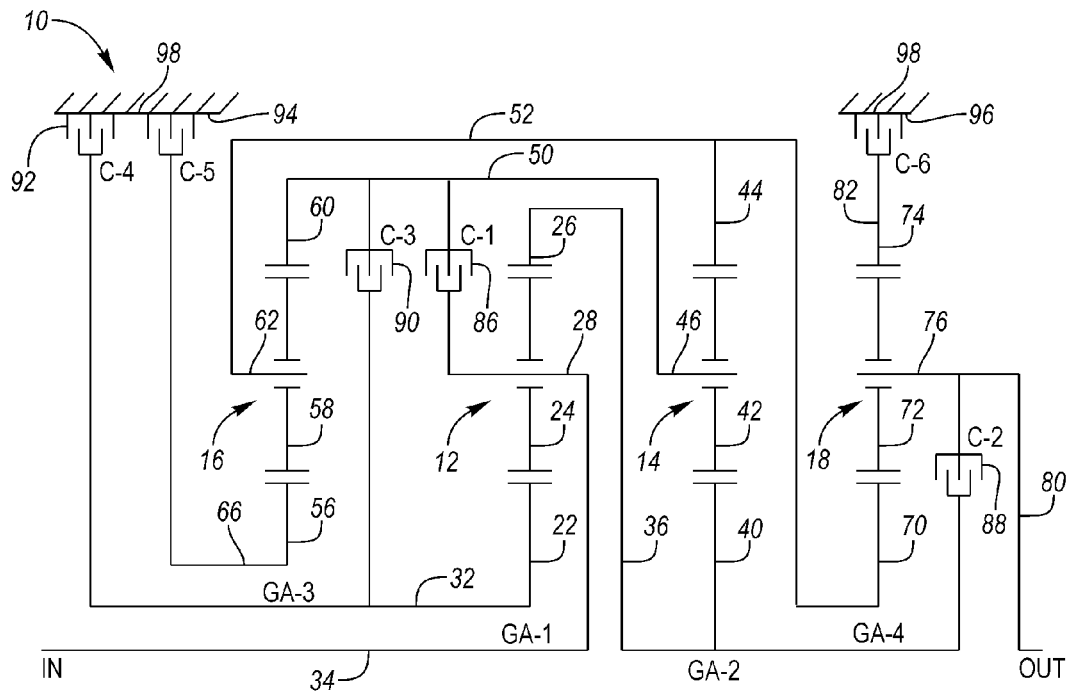
FIG. 1 is a schematic diagram of transmission-1.
FIG. 2 is a clutch chart for the transmission in FIG. 1.

FIG. 1 shows a schematic diagram of a transmission-1 10. The schematic diagramming of a transmission may be referred to as a stick diagram and the lines on the stick diagram may represent gearing-arrangements made up of gear-elements, shafts associated with the gear-elements, and the interconnection of the shafts with other shafts, gear-elements, or a transmission housing. A shaft may be any physical object used to transfer the movement (or hold movement) of an associated gear-element to another location, or to move (or hold) an associated gear-element in response to the shaft receiving that motion (or non-motion) from another location. The term associated, as used here, means that the shaft is rotated by the gear-element with which it is associated, and vice versa.

A gearing-arrangement is a collection of meshing gear-elements configured to impose specified speed relationships among the gear-elements. The speed relationships among the gear-elements may be determined by the number of teeth of the respective gear-elements. A linear speed relationship (LSR) exists among an ordered list of gear-elements when i) the first and last gear-element in the group are constrained to have the most extreme speeds, ii) the speeds of the remaining gear-elements are each constrained to be a weighted average of the first and last gear-element, and iii) when the speeds of the gear-elements differ, they are constrained to be in the listed order, either increasing or decreasing.

A discrete ratio transmission has a gearing-arrangement that selectively imposes a variety of speed ratios between an input-shaft and an output-shaft. Shafts associated with the gear-elements of a gearing-arrangement may be referred to as being connected to each other by the gearing-arrangement.

A gearing-arrangement may be a planetary gearset having as gearing-elements at least one planet gear disposed between a sun gear and a ring gear. In a simple planetary gearset, teeth of the planets mesh with both teeth of the sun and ring simultaneously. The planets are associated with a shaft referred to as a carrier. A simple planetary gearset is a type of gearing-arrangement that imposes a LSR among the sun, the carrier, and the ring. The LSR is from the sun to the carrier to the ring, or vice versa, and thus the linear speed relationship of the associated shafts follow. For example, if the shaft associated with the sun is held with no rotation (braked), then the shaft associated with the ring would have a greater rotational speed than the shaft associated with the carrier. Similarly, if the shaft associated with the ring is braked, then the shaft associated with the sun would have a greater rotational speed than the shaft associated with the carrier.

A double-pinion planetary gearset also imposes a LSR between a sun, planet, and ring. In a double-pinion planetary gearset, however, the carrier is associated with at least a pair of planets which are disposed between the sun and the ring. Teeth of the first planet mesh with teeth of the sun (without contacting the ring), teeth of the second planet mesh with teeth of the ring (without contacting the sun), and teeth of both planets mesh with each other. The LSR is from the sun to the ring to the carrier. For example, if the shaft associated with the sun is braked, then the shaft associated with the carrier will have a greater rotational speed than the shaft associated with the ring. If the shaft associated with carrier is braked, then the shaft associated with the sun will have a greater rotational speed than the ring. The speed of a gear-element may be referred to as positive when the gear-element rotates in one direction and negative when the gear-element rotates in the opposite direction.

A group of gear-elements are associated with one another if they are constrained to rotate as a unit in all operating conditions. Identified gear-elements would be associated with the same shaft, or one shaft would be considered to be associated with the identified gear-elements. Gear-elements may be associated by spline connections, welding, press fitting, machining from a common solid, or other means. Slight variations in rotational displacement between associated gear-elements may occur such as displacement due to lash or shaft compliance. A single gear-element associated with the transmission housing is constrained such that it does not experience rotation and may be referred to as a ground.

A gear-element or shaft may be selectively coupled to another gear-element, shaft or to the transmission housing by a clutch when the clutch constrains them to rotate (or to not rotate) as a unit whenever the clutch is fully engaged. In the case of selectively coupling two gear-elements, they are free to rotate at distinct speeds when the clutch is not fully engaged. The two gear-elements may be considered to be associated with two different shafts regardless of the clutch engagement state. A clutch that holds a gear-element or shaft against rotation by selectively connecting it to structure that does not rotate, such as the transmission housing, may be referred to as a brake. Non-rotating structure may be referred to as a ground. Clutch may be actively controlled devices such as hydraulically or electrically actuated clutches or brakes or may be passive devices such as one way clutches or brakes.

Transmission-1 10 has four gearing-arrangements (GA), GA-1 12, GA-2 14, GA-3 16, and GA-4 18. GA-1 12 is shown as a planetary gearset (PG-1) having a sun gear 22 (also referred to as sun-1 22), at least one planet gear 24 (also referred to as planets-1 24), and a ring gear 26 (also referred to as ring-1 26). Planets-1 24 are connected to a carrier-1 28. The sun-1 22 is associated with a shaft-1 32, the carrier-1 28 is associated with an input-shaft 34, and ring-1 26 is associated with a shaft-2 36. In this case, GA-1 12 is shown as a simple planetary gearset and the physical relationships between the gear-elements of GA-1 12 impose a linear speed relationship (LSR) among shaft-1 32, the input-shaft 34, and shaft-2 36.

GA-2 14 is shown as a planetary gearset (PG-2) having a sun-2 40, planets-2 42, and ring-2 44. Planets-2 42 are shown connected to a carrier-2 46. Sun-2 40 is associated with shaft-2 36, carrier-2 46 is associated with a shaft-3 50, and ring-2 44 is associated with a shaft-4 52. GA-2 14 is shown as a simple planetary gearset and as such the physical relationships between the gear-elements of GA-2 14 impose a LSR among shaft-2 36, shaft-3 50, and shaft-4 52. Ring-1 26 is associated with sun-2 40.

GA-3 16 is shown as a planetary gearset (PG-3) having a sun-3 56, planets-3 58, and ring-3 60. Planets-3 58 are shown connected to a carrier-3 62. Sun-3 56 is associated with shaft-5 66, carrier-3 62 is associated with shaft-4 52, and ring-3 60 is associated with shaft-3 50. GA-3 16 is shown as a simple planetary gearset and as such the physical relationships between the gear-elements of GA-3 16 impose a LSR among a shaft-5 66, shaft-4 52, and shaft-3 50. Ring-2 44 and Carrier-2 46 and are associated with carrier-3 62 and ring-3 60, respectively.

GA-4 18 is shown as a planetary gearset (PG-4) having a sun-4 70, planets-4 72, and ring-4 74. Planets-4 72 are shown connected to a carrier-4 76. Sun-4 70 is associated with shaft-4 52, carrier-4 76 is associated with an output-shaft 80, and ring-4 74 is associated with a shaft-6 82. GA-4 18 is also shown as a simple planetary gearset and as such the physical relationships between the gear-elements of GA-4 18 impose a LSR among shaft-4 52, the output-shaft 80, and shaft-6 82. Sun-4 70 is associated with both ring-2 44 and carrier-3 62.

Transmission-1 10 has six clutches (C), C-1 86, C-2 88, C-3 90, C-4 92, C-5 94, and C-6 96. C-1 86 is configured to selectively couple the input-shaft 34 to shaft-3 50. A clutch that is configured to selectively couple an input-shaft to any other shaft may be referred to as an input-clutch, and as such C-1 86 may also be input-clutch 86. C-2 88 is configured to selectively couple shaft-2 36 to an output-shaft 80. A clutch that is configured to selectively couple an output-shaft to any other shaft may be referred to as an output-clutch, and as such C-2 88 may also be output-clutch 88. C-3 90 is configured to selectively couple shaft-1 32 to shaft-3 50. C-4 92 is configured to selectively couple shaft-1 32 to a transmission housing 98, also referred to as a ground 98. C-5 94 is configured to selectively couple shaft-5 66 to the ground 98. C-6 96 is configured to selectively couple shaft-6 82 to a ground 98. C-4 92, C-5 94, and C-6 96 may also be referred to as brakes.

GA-3 16 and C-5 94 are configured to selectively impose an overdrive speed relationship from shaft-4 52 to shaft-3 50. Imposing an overdrive relationship means that one shaft rotates faster than the other from the slower shaft to the faster shaft. When C-5 94 is engaged shaft-3 50 rotates faster than shaft-4 52. GA-4 18 and C-6 96 are configured to selectively impose an overdrive speed relationship from the output-shaft 80 to shaft-2 36. When C-6 96 is engaged shaft-2 36 rotates faster than the output-shaft 80.

FIG. 2 illustrates a clutch engagement chart for transmission-1 10. The columns represent the respective clutches and the rows represent transmissions speeds. An 'X' in a cell indicates that the clutch of that column is engaged (in combination with others) to establish that speed. An automatic transmission may 'shift gears' from one speed to another by selectively engaging and/or disengaging clutches. Transmission-1 10 may have the clutches engaged in varying combinations of three to establish nine forward speeds and one reverse speed between input-shaft 34 and output-shaft 80. Transitioning, or 'shifting,' between speeds may follow a one-off/one-one disengagement/engagement strategy in which only one of the three clutches is disengaged with a new single clutch being engaged to change to the next speed. Although a one-off/one-one disengagement/engagement strategy is shown, multiple clutch disengagements with simultaneous or time spaced multiple clutch engagements may also be used. Multiple clutch disengagements with simultaneous or time spaced multiple clutch engagements may be used to skip speeds. Although transmission-1 10 is shown having nine forward speeds and one reverse speeds available, transmission-1 10 may utilize a control strategy that only employs a portion of the available speeds when used on a vehicle.

Transmission-1 10 may start with a first speed by engaging C-3 90, C-5 94, and C-6 96. Engaging C-3 90 couples shaft-1 32 with shaft-3 50, coupling sun-1 22 with both carrier-2 46 and ring-3 60. Engaging C-5 94 couples shaft-5 with the ground 98, braking sun-3 56. Engaging C-6 96 couples shaft-6 82 with the ground 98, braking ring-4 74. Transmission-1 10 may shift from the first speed to a second speed by disengaging C-3 90 and engaging C-1 86. Engaging C-1 86 couples the input-shaft 34 with shaft-3 50, coupling carrier-1 28 with both carrier-2 46 and ring-3 60. A subsequent third speed may be achieved by disengaging C-5 94 and engaging C-3. Having C-1 and C-3 engaged at the same time provides for the gear-elements of GA-1 12, GA-2 14, and GA-3 16 to rotate at the same speed.

A subsequent fourth speed may be achieved by disengaging C-3 90 and engaging C-2 88. Engaging C-2 88 couples shaft-2 36 with the output-shaft 80, coupling carrier-4 76 with sun-2 40 and ring-1 26. A subsequent fifth speed may be achieved by disengaging C-1 86 and engaging C-3 90. A subsequent sixth speed may be achieved by disengaging C-6 96 and engaging C-1 86. Having C-1 86, C-2 88, and C-3 90 engaged at the same time provides for all of the gear-elements in GA-1 12, GA-2 14, GA-3 16, and GA-4 18 to rotate at the same speed. In other words, simultaneous engagement of C-1 86, C-2 88, and C-3 90 provides for the input-shaft 34 to rotate at the same speed as the output-shaft 80. When the input-shaft 34 rotates at the same speed as the output-shaft 80, the transmission provides a 1:1 ratio, as can be seen in the ratio column.

A subsequent seventh speed may be achieved by disengaging C-1 86 and engaging C-5 94. A subsequent eighth speed may be achieved by disengaging C-3 90 and engaging C-1 86. A subsequent ninth speed may be achieved by disengaging C-1 86 and engaging C-4 92. Engaging C-4 92 couples shaft-1 32 with the ground 98, braking sun-1 22. In addition, a reverse speed may be achieved by engaging C-3 90, C-4 92, and C-6 96. In reverse, the output-shaft 80 rotates in an opposite direction from direction the output-shaft 80 rotates in all of the forward speeds.

FIG. 2 includes possible beta ratios for the gearing-arrangements of transmission-1 10. A beta ratio is a ratio between a pitch diameter of a ring-gear to a pitch diameter of a corresponding sun-gear in a planetary-gearset. In order for a planetary gearset to function properly, the teeth on each gear-element should be of corresponding pitch so as to mesh with one another. Gear-elements having meshable teeth also provide for the beta ratios to be determined by dividing the number of teeth of a ring gear by the number of teeth of a corresponding sun gear. GA-1 12 may have a beta ratio, beta-1, of 1.576. GA-2 14 may have a beta ratio, beta-2, of 1.982. GA-3 16 may have a beta ratio, beta-3, of 3.057. GA-4 18 may have a beta ratio, beta-4, of 1.569.

When the gearing-arrangements have beta ratios as indicated in FIG. 2, the speed ratios have the values indicated in the ratio column. For example, when the beta ratios of FIG. 2 apply to the transmission-1 10, the speed ratio for the first forward speed ratio is 4.429. While the transmission is operating in the first forward speed, the transmission may shift to the second forward speed having a second forward speed ratio of 3.409. Speed ratios may be modified and tuned by changing the beta ratios, which may be done by increasing or decreasing the number of teeth on corresponding sun-gears or ring-gears.

The step column in FIG. 2 also shows the steps between the speed ratios, which is the previous speed ratio divided by the current speed ratio. The step between the first forward speed ratio and the second forward speed ratio is 1.299 (=4.429/3.409). Smaller speed steps may be desirable for smoother speed transitions. Smaller speed steps may also allow the engine RPM to be controlled more precisely. Smaller speed steps, however, require more speed transitions to occur as a vehicle increases in overall velocity. Larger speed shifts may be employed to allow for less speed transitions to occur. As mentioned above, when employing a three clutch engagement per speed strategy, nine forward speeds are available, however in use, not all speeds may be employed when the transmission is used on a vehicle.

Figure 3:
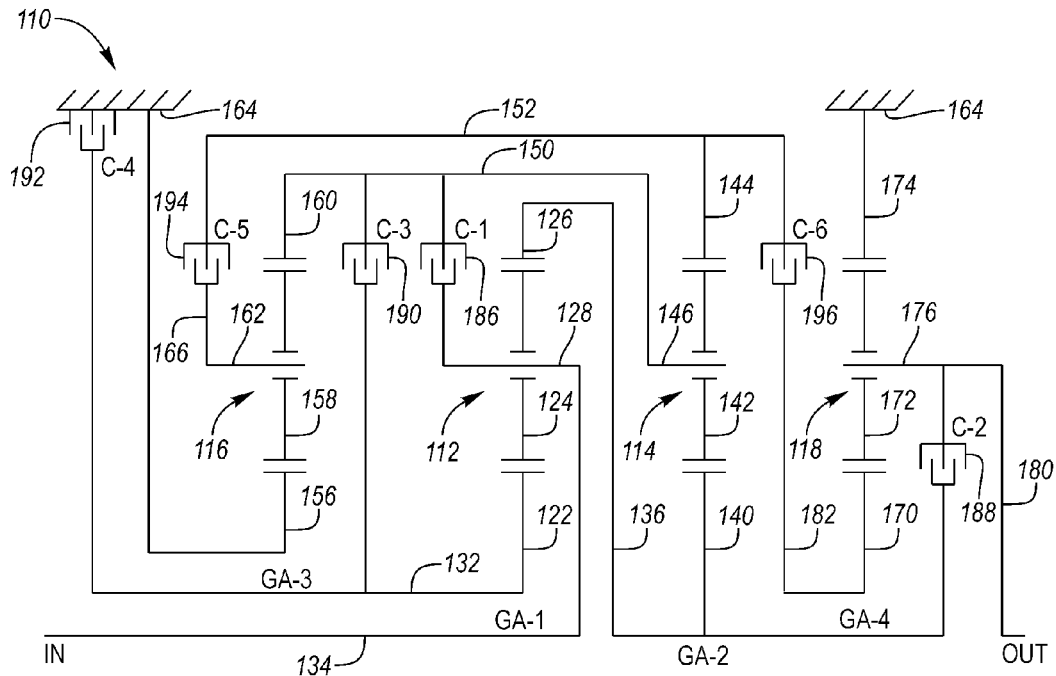
FIG. 3 is a schematic diagram of transmission-2.

FIG. 3 shows a schematic diagram of a transmission-2 110. Transmission-2 110 has four gearing-arrangements (GA), GA-1 112, GA-2 114, GA-3 116, and GA-4 118. GA-1 112 is shown as a planetary gearset (PG-1) having a sun-1 122, planets-1 124, and ring-1 126. Planets-1 124 are connected to a carrier-1 128. The sun-1 122 is associated with a shaft-1 132, the carrier-1 128 is associated with an input-shaft 134, and ring-1 126 is associated with a shaft-2 136. GA-1 112 is shown as a simple planetary gearset and the physical relationships between the gear-elements of GA-1 112 impose a LSR among shaft-1 132, the input-shaft 134, and shaft-2 136.

GA-2 114 is shown as a planetary gearset (PG-2) having a sun-2 140, planets-2 142, and ring-2 144. Planets-2 142 are shown connected to a carrier-2 146. Sun-2 140 is associated with shaft-2 136, carrier-2 146 is associated with a shaft-3 150, and ring-2 144 is associated with a shaft-4 152. GA-2 114 is shown as a simple planetary gearset and as such the physical relationships between the gear-elements of GA-2 114 impose a LSR among shaft-2 136, shaft-3 150, and shaft-4 152. Ring-1 126 is associated with sun-2 140.

GA-3 116 is shown as a planetary gearset (PG-3) having a sun-3 156, planets-3 158, and ring-3 160. Planets-3 158 are shown connected to a carrier-3 162. In this Figure, sun-3 156 is connected directly to the transmission housing 164, or ground 164, and is constrained from any rotation. Carrier-3 162 is associated with shaft-5 166, and ring-3 160 is associated with shaft-3 150. GA-3 116 is shown as a simple planetary gearset and as such the physical relationships between the gear-elements of GA-3 116 impose a LSR among the ground 164, a shaft-5 166, and shaft-3 150. Carrier-2 146 is associated with ring-3 160.

GA-4 118 is shown as a planetary gearset (PG-4) having a sun-4 170, planets-4 172, and ring-4 174. Planets-4 172 are shown connected to a carrier-4 176. Sun-4 170 is associated with a shaft-6 182, carrier-4 176 is associated with an output-shaft 180, and ring-4 174 connected directly to the transmission housing 164, or ground 164, and is constrained from rotation. GA-4 118 is shown as a simple planetary gearset and as such the physical relationships between the gear-elements of GA-4 118 impose a LSR among shaft-4 152, the output-shaft 180, and the ground 164.

Transmission-2 110 has six clutches (C), C-1 186, C-2 188, C-3 190, C-4 192, C-5 194, and C-6 196. C-1 186 is configured to selectively couple the input-shaft 134 to shaft-3 150, and as such C-1 186 may also be input-clutch 186. C-2 188 is configured to selectively couple shaft-2 136 to the output-shaft 180, and as such C-2 188 may also be output-clutch 188. C-3 190 is configured to selectively couple shaft-1 132 to shaft-3 150. C-4 192 is configured to selectively couple shaft-1 132 to the transmission housing 164, or ground 164. C-5 194 is configured to selectively couple shaft-5 166 to shaft-4 152. C-6 196 is configured to selectively couple shaft-6 182 to shaft-4 152. In this configuration, only C-4 192 may also be referred to as brake.

GA-3 116 and C-5 194 are configured to selectively impose an overdrive speed relationship from shaft-4 152 to shaft-3 150. When C-5 194 is engaged shaft-3 150 rotates faster than shaft-4 152. GA-4 118 and C-6 196 are configured to selectively impose an overdrive speed relationship from the output-shaft 180 to shaft-2 136. When C-6 196 is engaged shaft-2 136 rotates faster than the output-shaft 180.

Figure 4:
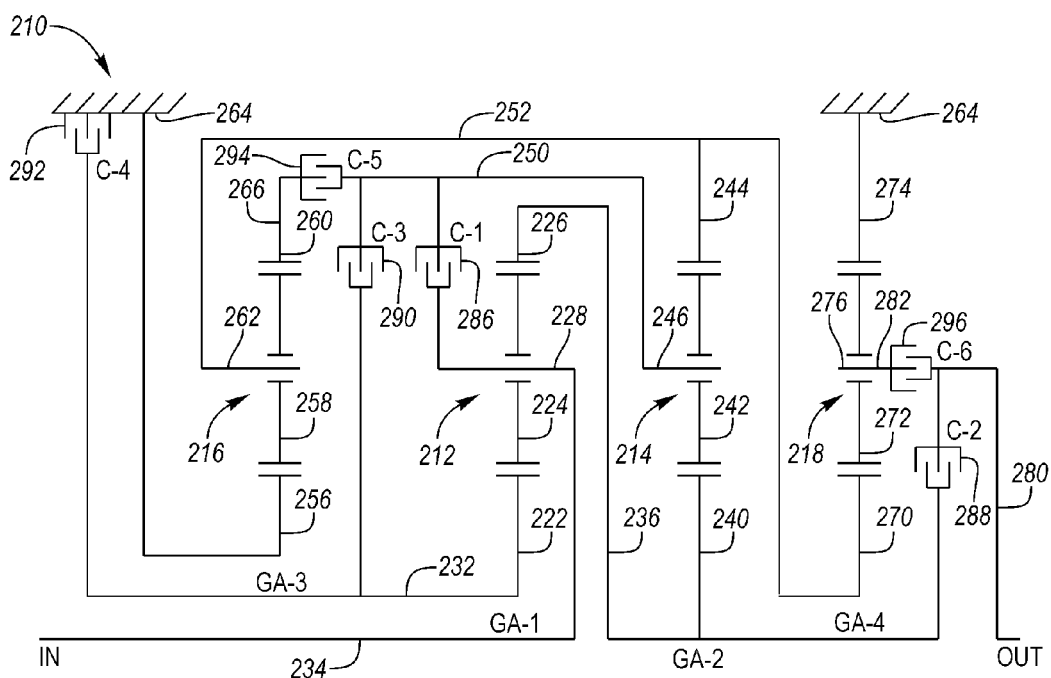
FIG. 4 is a schematic diagram of transmission-3.

FIG. 4 shows a schematic diagram of a transmission-3 210. Transmission-3 210 has four gearing-arrangements (GA), GA-1 212, GA-2 214, GA-3 216, and GA-4 218. GA-1 212 is shown as a planetary gearset (PG-1) having a sun-1 222, planets-1 224, and ring-1 226. Planets-1 224 are connected to a carrier-1 228. The sun-1 222 is associated with a shaft-1 232, the carrier-1 228 is associated with an input-shaft 234, and ring-1 226 is associated with a shaft-2 236. GA-1 212 is shown as a simple planetary gearset and the physical relationships between the gear-elements of GA-1 212 impose a LSR among shaft-1 232, the input-shaft 234, and shaft-2 236.

GA-2 214 is shown as a planetary gearset (PG-2) having a sun-2 240, planets-2 242, and ring-2 244. Planets-2 242 are shown connected to a carrier-2 246. Sun-2 240 is associated with shaft-2 236, carrier-2 246 is associated with a shaft-3 250, and ring-2 244 is associated with a shaft-4 252. GA-2 214 is shown as a simple planetary gearset and as such the physical relationships between the gear-elements of GA-2 214 impose a LSR among shaft-2 236, shaft-3 250, and shaft-4 252. Ring-1 226 is associated with sun-2 240.

GA-3 216 is shown as a planetary gearset (PG-3) having a sun-3 256, planets-3 258, and ring-3 260. Planets-3 258 are shown connected to a carrier-3 262. In this Figure, sun-3 256 is connected directly to the transmission housing 264, or ground 264, and is constrained from any rotation. Carrier-3 262 is associated with shaft-4 252, and ring-3 260 is associated with a shaft-5 266. GA-3 216 is shown as a simple planetary gearset and as such the physical relationships between the gear-elements of GA-3 216 impose a LSR among the ground 264, shaft-4 252, and shaft-5 266. Ring-2 244 is associated with carrier-3 262.

GA-4 218 is shown as a planetary gearset (PG-4) having a sun-4 270, planets-4 272, and ring-4 274. Planets-4 272 are shown connected to a carrier-4 276. Sun-4 270 is associated with shaft-2 236, carrier-4 276 is associated with a shaft-6 282, and ring-4 274 is connected directly to the transmission housing 264, or ground 264, and is constrained from rotation. GA-4 218 is shown as a simple planetary gearset and as such the physical relationships between the gear-elements of GA-4 218 impose a LSR among shaft-4 252, shaft-6 282, and the ground 264.

Transmission-3 210 has six clutches (C), C-1 286, C-2 288, C-3 290, C-4 292, C-5 294, and C-6 296. C-1 286 is configured to selectively couple the input-shaft 234 to shaft-3 250, and as such C-1 286 may also be input-clutch 286. C-2 288 is configured to selectively couple shaft-2 236 to the output-shaft 280, and as such C-2 288 may also be a first output-clutch 288. C-3 290 is configured to selectively couple shaft-1 232 to shaft-3 250. C-4 292 is configured to selectively couple shaft-1 232 to the transmission housing 264, or ground 264. C-5 294 is configured to selectively couple shaft-5 266 to shaft-3 250. C-6 296 is configured to selectively couple shaft-6 282 to the output-shaft 280, and as such C-6 296 may be a second output-clutch 296. In this configuration, only C-4 192 may also be referred to as brake.

GA-3 216 and C-5 294 are configured to selectively impose an overdrive speed relationship from shaft-4 252 to shaft-3 250. When C-5 294 is engaged shaft-3 250 rotates faster than shaft-4 252. GA-4 218 and C-6 296 are configured to selectively impose an overdrive speed relationship from the output-shaft 280 to shaft-2 236. When C-6 196 is engaged shaft-2 236 rotates faster than the output-shaft 280.

GA-3 16 from transmission-1 10, GA-3 116 from transmission-2 110, and GA-3 216 from transmission-3 210 may be interchanged as well as GA-4 18 from transmission-1 10, GA-4 118 from transmission-2 110, and GA-4 218 from transmission-3 210 along with the corresponding associations and connections as described above to provide nine different transmission options. Additional clutch charts for transmission-2 110 and transmission-3 210, as well as the additional six other transmission possibilities are not provided, however similar engagement/disengagement strategies may be used.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A transmission comprising:
    four gearing-arrangements GA-1, GA-2, GA-3, and GA-4 and six clutches C-1, C-2, C-3, C-4, C-5, and C-6,
    wherein GA-1 is configured to fixedly impose a linear speed relationship (LSR) among a shaft-1, an input-shaft and a shaft-2, GA-2 is configured to fixedly impose a LSR among shaft-2, a shaft-3, and a shaft-4, C-1 is configured to selectively couple the input-shaft to shaft-3, C-2 is configured to selectively couple shaft-2 to an output-shaft, and C-3 is configured to selectively couple shaft-1 to shaft-3.

2. The transmission of claim 1 wherein GA-1 is a planetary gearset (PG) having a sun-1, carrier-1 and ring-1 respectively associated with shaft-1, the input-shaft and shaft-2.

3. The transmission of claim 1 wherein GA-2 is a planetary gearset having a sun-2, carrier-2 and ring-2 respectively associated with shaft-2, shaft-3 and shaft-4.

4. The transmission of claim 1 wherein C-4 is a brake configured to selectively couple shaft-1 to a ground.

5. The transmission of claim 1 wherein GA-3 and C-5 are configured to selectively impose an overdrive speed relationship from shaft-4 to shaft-3.

6. The transmission of claim 5 wherein GA-3 is configured to impose a LSR among a shaft-5, shaft-4 and shaft-3 and C-5 is a brake configured to selectively couple shaft-5 to a ground.

7. The transmission of claim 6 wherein GA-3 is a planetary gearset having a sun-3, carrier-3 and ring-3 respectively associated with shaft-5, shaft-4 and shaft-3.

8. The transmission of claim 1 wherein GA-4 and C-6 are configured to selectively impose an overdrive speed relationship from the output-shaft to shaft-2.

9. The transmission of claim 8 wherein GA-4 is configured to impose a LSR among a shaft-4, the output-shaft and shaft-6 and C-6 is a brake configured to selectively couple shaft-6 to a ground.

10. The transmission of claim 9 wherein GA-4 is a planetary gearset having a sun-4, carrier-4 and ring-4 respectively associated with shaft-4, the output-shaft and shaft-6.

11. A transmission comprising:
four planetary gearsets PG-1, PG-2, PG-3, and PG-4 and six clutches including C-1, C-2, C-3, and C-4, wherein PG-1 has a sun-1, carrier-1 and ring-1, carrier-1 being associated with an input-shaft, PG-2 has a sun-2, carrier-2 and ring-2, sun-2 being associated with ring-1, C-1 is configured to selectively couple carrier-1 to carrier-2, C-2 is configured to selectively couple sun-2 to an output-shaft, and C-3 is configured to selectively couple sun-1 to carrier-2.

12. The transmission of claim 11 wherein C-4 is configured to selectively couple sun-1 to a ground.

13. The transmission of claim 12 wherein PG-3 has a sun-3, carrier-3 associated with ring-2, and ring-3 associated with carrier-2.

14. The transmission of claim 13 wherein the six clutches includes C-5 which is configured to selectively couple sun-3 to the ground.

15. The transmission of claim 14 wherein PG-4 has a sun-4 associated with ring-2 and carrier-3, a carrier-4 associated with an output-shaft, and a ring-4.

16. The transmission of claim 15 wherein the six clutches includes C-6 which is configured to selectively couple ring-4 to the ground.

17. A transmission comprising:
four gearing-arrangements GA-1, GA-2, GA-3, and GA-4 and six clutches C-1, C-2, C-3, C-4, C-5, and C-6, wherein GA-1 is configured to fixedly impose a linear speed relationship (LSR) among a shaft-1, an input-shaft and a shaft-2, GA-2 is configured to fixedly impose a LSR among shaft-2, a shaft-3, and a shaft-4, GA-3 is configured to fixedly impose a LSR among shaft-3, shaft-4 and a shaft-5, and GA-4 is configured to fixedly impose a LSR among shaft-4, an output-shaft and a shaft-6, wherein C-2 is configured to selectively couple shaft-2 to an output-shaft.

18. The transmission of claim 17 wherein C-1 is configured to selectively couple the input-shaft to shaft-3.

19. The transmission of claim 17 wherein C-3 is configured to selectively couple shaft-1 to shaft-3.

20. The transmission of claim 17 wherein C-4 is configured to selectively couple shaft-1 to a ground.

21. The transmission of claim 17 wherein C-5 is configured to selectively couple shaft-5 to a ground.

22. The transmission of claim 17 wherein C-6 is configured to selectively couple shaft-6 to a ground.

* * * * *